(12) United States Patent
Mudalige

(10) Patent No.: US 7,546,182 B2
(45) Date of Patent: Jun. 9, 2009

(54) INTER VEHICULAR AD HOC ROUTING PROTOCOL AND COMMUNICATION SYSTEM

(75) Inventor: Upali Priyantha Mudalige, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 485 days.

(21) Appl. No.: 11/358,441

(22) Filed: Feb. 21, 2006

(65) Prior Publication Data

US 2007/0198140 A1    Aug. 23, 2007

(51) Int. Cl.
*G06F 17/00* (2006.01)

(52) U.S. Cl. .......................................... 701/1; 701/207

(58) Field of Classification Search ...................... 701/1, 701/200, 207, 213–215, 96; 340/988; 342/357.06
See application file for complete search history.

(56) References Cited

U.S. PATENT DOCUMENTS 7,133,768 B2 * 11/2006 Mukaiyama ................. 701/200

* cited by examiner

*Primary Examiner*—Yonel Beaulieu

(57) ABSTRACT

A routing protocol and inter-vehicle communication system adapted for use with a traveling host vehicle, and at least one traveling remote vehicle, includes a locator sub-system configured to determine a plurality of current position coordinates for the host and remote vehicles. The preferred system is configured to store trail coordinates, derive vehicular headings and trail polygons from the trail coordinates, and effect the directional multi-hop propagation of a message by comparing current position coordinates, trail coordinates, headings and/or trail polygons of the host and remote vehicles.

17 Claims, 4 Drawing Sheets

INTER VEHICULAR AD HOC ROUTING PROTOCOL AND COMMUNICATION SYSTEM

BACKGROUND OF THE INVENTION

1. Technical Field

The present invention relates to routing protocols and communication systems adapted for use with vehicles, and more particularly to an improved protocol and system configured to forward a communication towards a destination through inter-vehicular transmission, and without the use of a map database.

2. Background Art

Vehicular communication systems have been developed to inform targeted groups of vehicles of events or conditions deemed relevant to a particular group. Often, these groups can be categorized within one of a plurality of classes including opposite traffic approaching the condition, and same-way traffic approaching the condition. These conventional systems typically rely upon a traffic information center operable to transmit an alert of the condition to the targeted group, and at least one probe vehicle operable to transmit notification of the condition to the center. Alternatively, inter-vehicular communications amongst probe vehicles have also been developed in vehicle-to-vehicle (V2V) enabled environments, wherein the communications are transmitted directly between vehicles. To target directional traffic, both types of systems, as well as combinations thereof, must distinguish approaching versus departing traffic, and opposite versus same-way traffic.

To accomplish this task, both of these systems utilize a map database that cooperates with a locator sub-system to determine the locations and headings of the target group vehicles and the probe vehicle. For example, where a potentially targeted vehicle and the probe vehicle are located on opposite sides of a thoroughfare, according to the map database and locator sub-system, opposite headings are assumed, and whether the remote vehicle is approaching the probe vehicle is determinable by their absolute positions upon the map.

However, the requirement of a map database, typically at the probe vehicle and center, presents operational and scalability concerns. First, maintaining and updating a map database, so as to assure its accuracy, results in significant expenditures including labor costs. Storage requirements at the probe vehicle and center to store the often voluminous database further require increased system capacity and hardware. Finally, the amount of data required to be communicated and processed in real-time at the center is also increased by the transmission and management of the map database. As additional vehicles are added to these systems, these concerns proportionally increase.

SUMMARY OF THE INVENTION

Responsive to these and other concerns, an inter-vehicle communication system and method of transmitting a message between a host vehicle and at least one remote vehicle is described herein. The inventive system and method relies upon current and trail positional coordinates for the host and remote vehicles to directionally propagate the message, and does not require a map database. Among other things, the inventive system is useful for providing a routing protocol and communication system that enables smaller message propagation latency, high penetration distance within an event lifetime, high reliability of selecting a valid set of mobile nodes (i.e. vehicles) or routing messages at any time, and lower levels of link loads during data transmission, which in turn controls the protocol's effectiveness of controlling network flooding.

Relying on vehicle-to-vehicle (V2V) communication, a first aspect of the present invention concerns a vehicular communication system adapted for use with a traveling host vehicle and a traveling remote vehicle spaced from and communicatively coupled to the host vehicle. The system comprises at least one locator sub-system configured to determine current position coordinates for the host vehicle at multiple points along a trip. The host vehicle includes a controller communicatively coupled to the sub-system, and configured to store for at least a period the position coordinates, so as to build a history of host vehicle trail coordinates. The host vehicle is configured to autonomously determine a host vehicle heading, based on the current position coordinates, and history of trail coordinates. The host and remote vehicles are cooperatively configured to selectively transmit a message from the host vehicle to the remote vehicle based on the current position or trail coordinates of the host vehicle, and without the use of a map database.

A second aspect of the present invention concerns a method of selectively communicating a message from a source to at least one traveling vehicle. The method includes the steps of determining current position coordinates for the source, and determining and storing current position coordinates relative to the source, at multiple points along a trip, so as to build a history of trail coordinates, for said at least one traveling vehicle. Based on the history of trail coordinates, a current heading relative to the source is determined for said at least one traveling vehicle. Finally, the method causes the message to be selectively transmitted from the source to said at least one traveling vehicle, based on the current heading and position coordinates of the traveling vehicle relative to the source.

It will be understood and appreciated that the present invention provides a number of advantages over the prior art, including, for example, selectively communicating to at least one remote vehicle a message (e.g. a traffic condition, an alert, etc.). This invention increases the efficiency of communication systems, by eliminating the use of a traffic information center and long-range vehicle to center transmissions. The use of V2V communication further provides greater reliability and function than do conventional center-based systems.

Other aspects and advantages of the present invention will be apparent from the following detailed description of the preferred embodiment(s) and the accompanying drawing figures.

BRIEF DESCRIPTION OF DRAWINGS

Preferred embodiments of the invention are described in detail below with reference to the attached drawing figures, wherein.

DESCRIPTION OF THE PREFERRED EMBODIMENT(S)

As shown in FIGS. 1 through 3a, the present invention concerns an improved routing protocol and communication system 10 adapted for use with a host (or originating) vehicle 12 and by an operator 14. The system 10 is illustrated and described herein with respect to automotive vehicles, such as cars, SUV's, trucks, etc. However, it may also be utilized with aircrafts, watercrafts, human motility, or other modes of transportation where selective information transfer is useful. In general, the system 10 is configured to disseminate (i.e. propagate) a wireless message to a targeted group of vehicles (e.g. downstream vehicles headed in the same direction, etc.) using vehicle-to-vehicle communication technology (V2V). The inventive system 10 distinguishes the targeted group of vehicles from other in-range vehicles by considering current and past (i.e. trail) position coordinates and headings of the vehicles involved.

Figure 1:
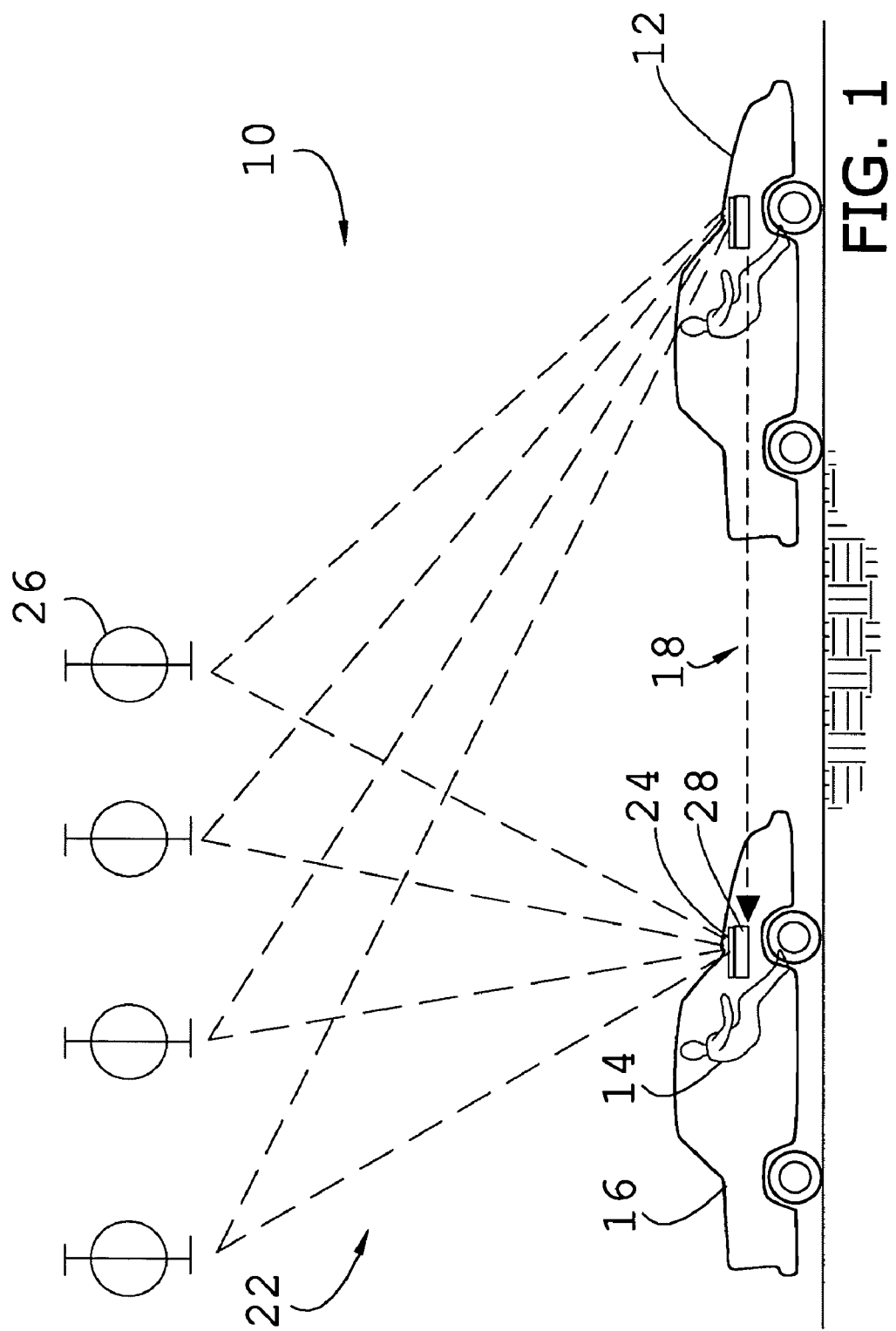
FIG. 1 is an elevation view of a host vehicle, and a remote vehicle communicatively coupled to the host vehicle, in accordance with a preferred embodiment of the present invention, particularly illustrating a locator sub-system.
Figure 2:
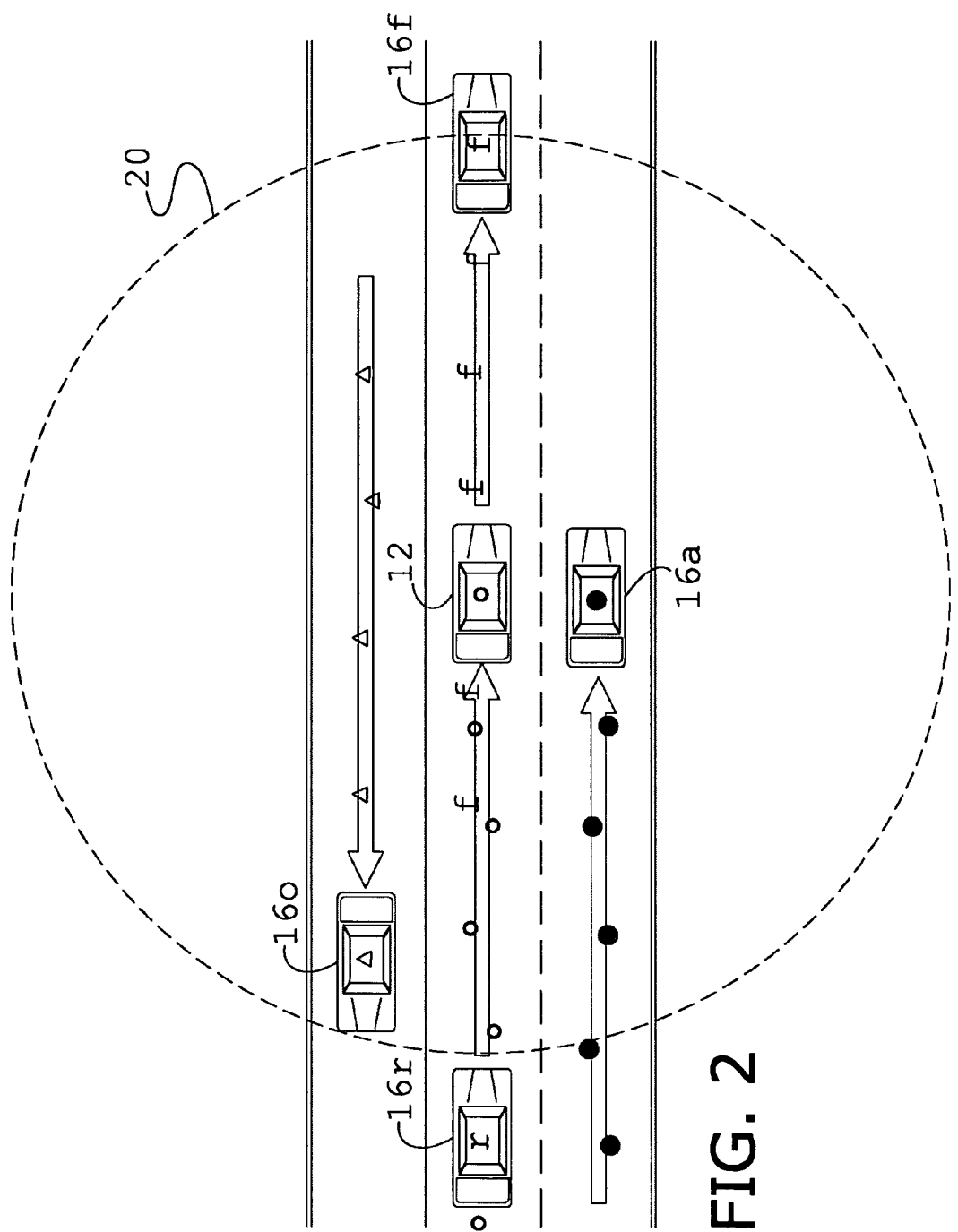
FIG. 2 is a plan view of a host vehicle surrounded by a plurality of remote vehicles traveling upon a thoroughfare, and the current position and trail coordinates, for the vehicles, particularly illustrating a broadcast communication zone.

Turning first to FIG. 1, a host vehicle 12 and at least one remote vehicle 16 are shown communicatively coupled by a conventional V2V communication sub-system 18. For example, the vehicles 12,16 may be coupled by a radio local area network, RF technology, or other conventional means that enables inter-vehicle sharing of information in real-time. It is appreciated that the reliability of the system 10 depends on the accuracy of the V2V communication sub-system involved. More particularly, and as shown in FIG. 2, the host vehicle 12 is configured to broadcast, and the remote vehicles 16 are configured to receive, the message within a communication zone 20. In an alternative embodiment, the vehicles 12,16 may be communicatively coupled through an intermediary third-party (not shown) that continuously collects the relevant coordinate data, performs the determinations described herein, and transmits the message to the targeted group of vehicles.

To accomplish directional propagation, the preferred system 10 includes a locator sub-system 22 adapted for use by the host and remote vehicles 12,16. The preferred locator sub-system 22 is configured to concurrently determine current position and trail coordinates for the host and remote vehicles 12,16. Each coordinate preferably includes longitude, latitude and height scalar components, and are preferably determined using a Global Navigation Satellite System (GNSS), or GPS. As shown in FIG. 1, where a GNSS is utilized, the host and remote vehicles 12,16 further include GNSS receivers 24 positioned within the respective vehicles 12,16. A plurality of satellites 26 is communicatively coupled to each receiver 24. Thus, the locator sub-system 22 may function within an absolute coordinate system. Alternatively, other signal sources located at control points could be communicatively coupled to a receiver, and other coordinate systems based on a variety of geodetic datums, units, projections, and references, such as Military Grid Reference System (MGRS) or ECEF X,Y,Z.

In the preferred embodiments shown in FIGS. 1 through 4, each of the vehicles 12,16 further includes a programmable controller 28 configured to cooperatively perform, and store the position coordinates for a predetermined period sufficient to carry out, the functions of the present invention. More preferably, as shown in FIG. 2, the period is related to the speed of the vehicle 12 and communication range, so that the communication zone radius of the V2V sub-system 18 is not greater than the length of the trail (i.e., the linear distance between the furthest trail and current position coordinates). Most preferably, the radius is equal to the distance, so as to minimize non-useful data collection. Finally, the communication zone radius and period are preferably adjustable, and more preferably, as a function of existing traffic conditions and V2V subsystem characteristics, such as traffic density, relative vehicle distances, and reception signal quality. In this configuration, the controller 28 is preferably configured to determine the conditions and attribute a condition factor to each. For example, the conditions may be manually inputted, or a plurality of sensors (not shown) may be utilized to detect the traffic conditions.

Alternatively, the host vehicle 12 may be further configured to determine and correlate host and remote vehicle position coordinates, so as to determine the relative coordinates between the vehicles 12,16. For example, the host vehicle 12 may include at least one sensor configured to detect the remote vehicle 16; and the controller 28 may be configured to estimate the absolute coordinates of the remote vehicle based on the absolute coordinates of the host vehicle 12, and the detected relative coordinates of the remote vehicle 16. In the relative coordinate system, the received signal strength or time of flight for messages sent between vehicles or raw GNSS receiver range data such as range to satellites could be used to establish the relative positions between vehicles which could then be used to generate trail information.

One of the novel aspects of the invention is that the preferred system 10 does not require a map database to determine relative vehicle positioning and heading. Thus, the system 10 preferably functions without conventional storage means, such as a DVD-ROM, internal hard disk, or removable memory card. As such, it is appreciated that the present invention eliminates costs associated with database management, transmission and storage, common to conventional traffic information systems.

Figure 3:
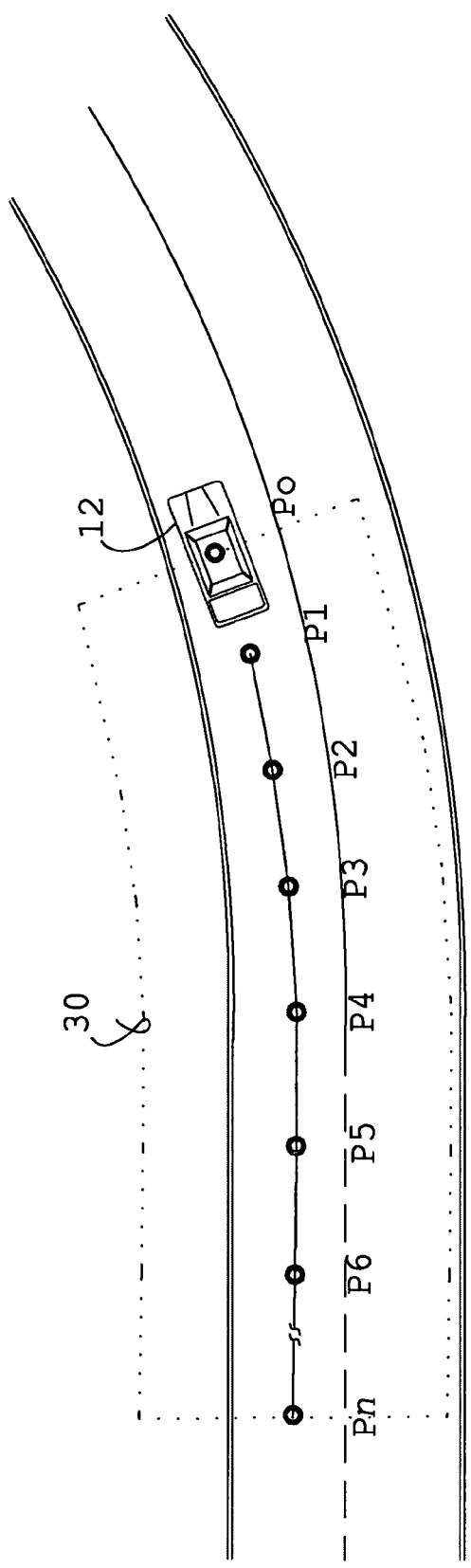
FIG. 3 is a plan view of a host vehicle traveling upon a thoroughfare, particularly illustrating a trail polygon.
Figure 3A:
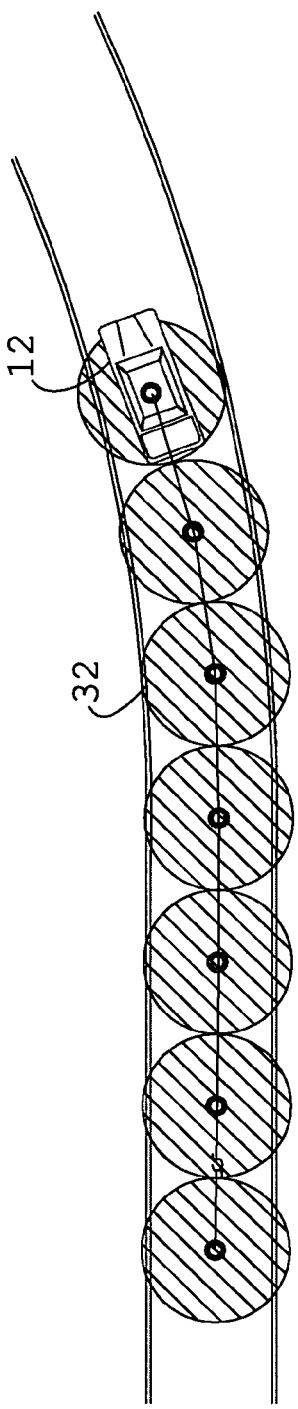
FIG. 3*a* is a plan view of a host vehicle traveling upon a thoroughfare, particularly illustrating general trail coordinates.

The inventive controller 28 is communicatively coupled to the locator sub-system 22, and preferably configured to autonomously determine a heading, speed V, and trail polygon 30 for the host vehicle 12, based upon stored position coordinates. As previously mentioned, the speed is utilized to determine the proper number and/or period interval of the trail coordinates (depicted as P1 through Pn in FIG. 3). The trail polygon 30 presents a homogenous area that encompasses the trail coordinates, and is preferably constructed by offsetting the line formed by connecting the trail coordinates. So as to enable functionality, the width of the polygon 30 is preferably at least equal to the width of same-way and opposite traffic along a particular thoroughfare. Alternatively, where polygons are not determined, the controller 28 may be configured to generate general coordinates 32, by attributing an area defined by a radius to each trail coordinate, as shown in FIG. 3a. More preferably, the radius is equal to one-half the distance between adjacent coordinates.

The controller 28 generates and transmits the message to the communication sub-system 18. The preferred message includes a segment of generated or otherwise received useful information, and a message header consisting of coordinate, trail polygon or general coordinate data. The message header also provides the propagation instructions (e.g. rearward same-way traffic, forward same-way traffic, bi-directional same-way traffic, rearward opposite traffic, forward opposite traffic, and bi-directional opposite traffic) in the form of a bit-mask.

Figure 4:
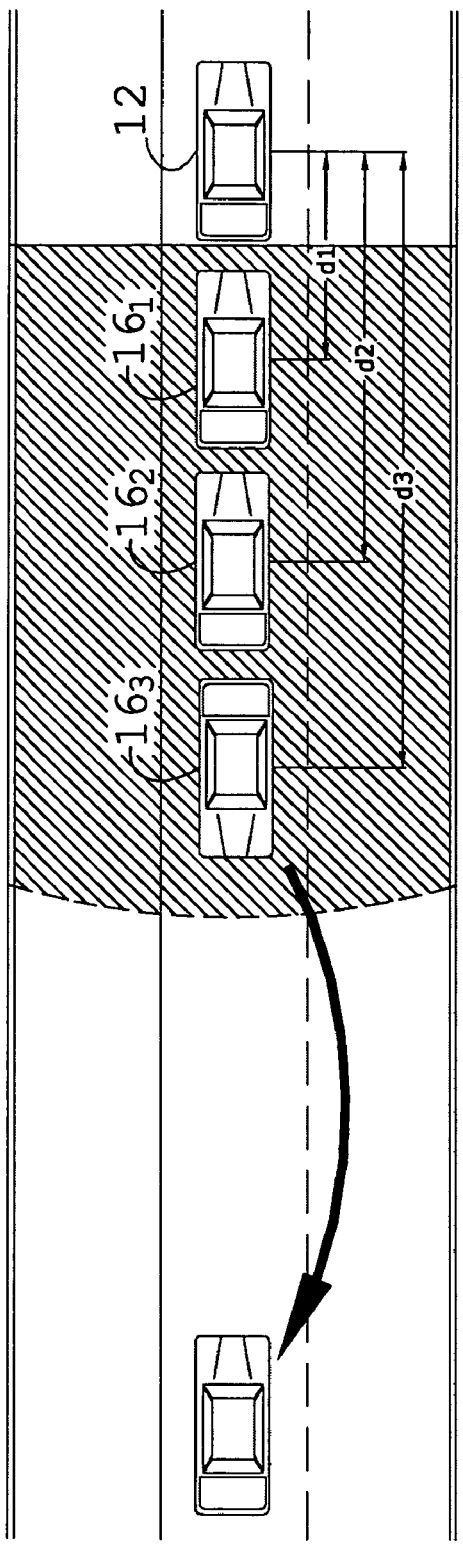
FIG. 4 is a plan view of a host vehicle and plurality of remote vehicles within the communication zone, particularly illustrating prioritization of dissemination.

To achieve directional propagation, the remote vehicle 16 is configured to receive, modify, and/or retransmit the message according to the instructions. More preferably, so as to prioritize the dissemination of the message between a plurality of receiving remote vehicles 16, each of the remote vehicle controllers 18 is configured to wait a prioritization period inversely proportional to the distance between the host vehicle 12 and the remote vehicle 16 prior to retransmitting the message, so that the furthest of the remote vehicles 16 that receive the message from the host vehicle 12 retransmits first. The preferred controller 28 in this configuration, includes a back-off timer configured to count-down the period prior to retransmitting the message. For example, as shown in FIG. 4, where remote vehicles $16_1$, $16_2$, and $16_3$ are in the direct transmission range of the host vehicle or source 12, each are configured to determine their relative distances (i.e. $d_1$, $d_2$, and $d_3$) from the source. When each of their timers expire that vehicle retransmits the message. Thus as shown in FIG. 4, vehicle $16_3$ will achieve priority and retransmit first.

Returning to FIGS. 2 and 3, a preferred method of propagating a message in a rearward same-way traffic direction includes determining a host vehicle heading and constructing a host vehicle trail polygon 30, from its trail coordinates (depicted as open-circles in FIG. 2). The host vehicle 12, then, broadcasts the message, including its trail polygon 30 and heading in the message header, within the communication zone 20. The message instructs a remote vehicle 16 within the zone 20 to accept the message only if its current position coordinates are located within the host vehicle trail polygon 30 and it presents the same general heading (i.e. within 60 degree congruency). For example, in FIG. 2, remote vehicle 16r would be instructed to accept the message, while vehicles 16f, a, and o would not. Remote vehicle 16r would then re-broadcasts the same message, so as to propagate the message in the rearward same-way traffic direction.

A preferred method of propagating a message in a forward same-way traffic direction includes determining the current position coordinates and heading of the host vehicle 12. The host vehicle 12 broadcasts the message, including its current position coordinates and heading in the message header, within the communication zone 20. The message instructs a remote vehicle 16 to accept the message only if its trail polygon 30 overlaps the current position coordinates of the host vehicle 12 and its heading is generally congruent with the host vehicle heading. For example, in FIG. 2, remote vehicle 16f would be instructed to accept the message, while vehicles 16r, a, and o would not. Remote vehicle 16f then broadcasts the same message, so as to propagate the message in the forward same-way traffic direction. If the event is to be transmitted in a bi-directional mode, both forward and rearward configurations are employed concurrently.

A preferred method of propagating a message to opposing traffic includes determining and broadcasting the current heading of the host vehicle 12. Only remote vehicles 16 heading in the opposite direction, such as 16o in FIG. 2, are instructed to accept the message. In this configuration, however, it is appreciated that the message must be modified after the first transmission in order to effect continued propagation in the direction opposite to the host vehicle 12. Finally, it is preferable, under either configuration, for the remote vehicle 16 to send a "return receipt" to the host vehicle 12 upon acceptance of the message, so as to terminate the latency period (i.e., the life time) of the message.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventor hereby state his intent to rely on the Doctrine of Equivalents to determine and assess the reasonably fair scope of the present invention as pertains to any system or method not materially departing from but outside the literal scope of the invention as set forth in the following claims.

What is claimed is:

1. A vehicular communication system adapted for use with a traveling host vehicle and a traveling remote vehicle spaced from and communicatively coupled to the host vehicle, said system comprising:

at least one locator sub-system configured to determine current position coordinates for the host vehicle at multiple points along a trip, said host vehicle including a controller communicatively coupled to the sub-system, and configured to store for at least a period the position coordinates, so as to build a history of host vehicle trail coordinates, and autonomously determine a host vehicle heading, based on the current position coordinates, and history of trail coordinates, said host and remote vehicles being cooperatively configured to selectively transmit a message from the host vehicle to the remote vehicle based on the current position or trail coordinates of the host vehicle, said host vehicle being configured to broadcast the message within a zone, wherein the zone is cooperatively defined by a predetermined radius not greater than the linear distance between the position coordinates of the furthest of said multiple points and the current position of the host vehicle said at least one remote vehicle being configured to determine its current position coordinates, and receive the message only when its current position is within the zone.

2. The system as claimed in claim 1, said locator sub-system being further configured to concurrently determine current position coordinates for said at least one remote vehicle, at multiple points along a remote vehicle trip, so as to build a history of remote vehicle trail coordinates, said host and remote vehicles being cooperatively configured to selectively transmit a message from the host vehicle to the remote vehicle based on the current position or trail coordinates of the host and remote vehicles.

3. The system as claimed in claim 1, wherein the radius is adjustable, as a function of traffic density, relative vehicle distances, and reception signal quality.

4. The system as claimed in claim 1, at least a portion of the message including the trail coordinates and heading of the host vehicle.

5. The system as claimed in claim 4, said host vehicle being further configured to determine a trail polygon based on the host vehicle trail coordinates, said message including the host vehicle trail polygon, said remote vehicle being further configured to determine its current position relative to the host vehicle trail polygon, and to accept the message only if its current position and the host vehicle trail polygon present an overlap.

6. The system as claimed in claim 1, at least a portion of the message including the current position coordinates of the host vehicle.

7. The system as claimed in claim 6, said remote vehicle being configured to determine and store its current position coordinates at multiple points along a trip, so as to build a history of remote vehicle trail coordinates, said remote vehicle being further configured to determine a remote vehicle trail polygon based on the history of remote vehicle trail coordinates, and to accept the message only if the host vehicle current position coordinates and the remote vehicle trail polygon present an overlap.

8. The system as claimed in claim 7,
said message further including the host vehicle heading,
said remote vehicle being further configured to determine its heading based on its trail coordinates, and accept the message based on a comparison of the host and remote vehicle headings.

9. The system as claimed in claim 1,
said host vehicle including at least one sensory element configured to concurrently determine current position and trail coordinates for said at least one remote vehicle relative to the host vehicle, so as to determine a relative current position and heading for said at least one remote vehicle.

10. A vehicular communication system adapted for use with a traveling host vehicle and at least one traveling remote vehicle spaced from and communicatively coupled to the host vehicle, said system comprising:
at least one locator sub-system configured to determine current position coordinates for the host vehicle at multiple points along a trip,
said host vehicle including a controller communicatively coupled to the sub-system, and configured to store for at least a period the position coordinates, so as to build a history of host vehicle trail coordinates, and autonomously determine a host vehicle heading and construct a trail polygon, based on the current position coordinates, and history of trail coordinates,
said locator sub-system and remote vehicle being cooperatively configured to concurrently determine and store current position coordinates for said at least one remote vehicle, at multiple points along a remote vehicle trip, so as to build a history of remote vehicle trail coordinates, and to construct a remote vehicle trail polygon from the trail coordinates,
said host and remote vehicles being cooperatively configured to selectively transmit a message from the host vehicle to the remote vehicle based on the current position and trail polygons of either the host or remote vehicle,
said at least one remote vehicle being further configured to re-transmit the message to another remote traveling vehicle upon receipt of the message.

11. A method of selectively and autonomously communicating a message from a source to at least one traveling vehicle, said method comprising the steps of:
a. determining current position coordinates for the source;
b. determining and storing current position coordinates relative to the source, at multiple points along a trip, so as to build a history of trail coordinates, for said at least one traveling vehicle;
c. determining a current heading, based on the history of trail coordinates, relative to the source, for said at least one traveling vehicle; and
d. causing the message to be selectively transmitted from the source to said at least one traveling vehicle, based on the current heading and position coordinates of the traveling vehicle relative to the source, wherein causing the message to be selectively transmitted further includes broadcasting the message within a zone, determining whether the current position coordinates of said at least one traveling vehicle is within the zone, and encoding the message with the position coordinates of the source, and acceptance instructions, so that the message is propagated in one of a plurality of directions consisting essentially of rearward same-way traffic, forward same-way traffic, bi-directional same-way traffic, rearward opposite traffic, forward opposite traffic, and bi-directional opposite traffic.

12. The method as claimed in claim 11; and
e. causing a return receipt to be transmitted from said at least one traveling vehicle to the source, and terminating the transmission of the message by the source upon receipt of the receipt.

13. The method as claimed in claim 11,
steps (b), (c), and (d) further including the steps of determining current position coordinates at multiple points along a trip, so as to build a history of trail coordinates, and a heading based on the history of trail coordinates, for each of a plurality of traveling vehicles, and further causing the message to be retransmitted from said at least one traveling vehicle to other traveling vehicles.

14. The method as claimed in claim 13,
step (d) further including the steps of repetitively transmitting the message for a predetermined latency period.

15. The method as claimed in claim 13,
step (d) including the steps of prioritizing the dissemination of the message, wherein each of said at least one traveling vehicle waits a prioritization period inversely proportional to the distance between the source and said each of said at least one traveling vehicle, prior to re-transmitting the message, so that the furthest of said at least one traveling vehicle retransmits first.

16. The method as claimed in claim 13,
step (d) further including the steps of causing the message to be directionally propagated.

17. The method as claimed in claim 16,
step (d) further including the steps of modifying the message after the first transmission.

* * * * *